United States Patent
Park et al.

(10) Patent No.: US 9,530,364 B2
(45) Date of Patent: Dec. 27, 2016

(54) LIQUID CRYSTAL DISPLAY

(71) Applicant: Samsung Display Co., Ltd., Yongin, Gyeonggi-Do (KR)

(72) Inventors: Seung Hyun Park, Seoul (KR); Sung In Ro, Hwaseong-si (KR); Jean Ho Song, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 155 days.

(21) Appl. No.: 14/203,749

(22) Filed: Mar. 11, 2014

(65) Prior Publication Data

US 2014/0292626 A1    Oct. 2, 2014

(30) Foreign Application Priority Data

Mar. 29, 2013 (KR) .................. 10-2013-0034891

(51) Int. Cl.
*G09G 3/36* (2006.01)
*G02F 1/1362* (2006.01)
*G02F 1/1333* (2006.01)

(52) U.S. Cl.
CPC ....... *G09G 3/3611* (2013.01); *G02F 1/136286* (2013.01); *G02F 2001/133388* (2013.01); *G02F 2201/40* (2013.01); *G09G 2300/0413* (2013.01); *G09G 2300/0426* (2013.01)

(58) Field of Classification Search
CPC ............... G09G 3/3611; G09G 2300/0413; G09G 2300/0404; G09G 2300/04; G09G 2300/00; G02F 1/136286; G02F 2001/13629;G02F 2001/136218; G02F 2001/136254; G02F 2001/133388; G02F 1/133; G02F 2201/40
USPC ........................................... 345/87
See application file for complete search history.

(56) References Cited

U.S. PATENT DOCUMENTS

| | | | |
|---|---|---|---|
| 6,801,275 B2 | 10/2004 | Lim | |
| 8,188,479 B2* | 5/2012 | Liu | G02F 1/136259 257/59 |
| 8,194,217 B2 | 6/2012 | Yoshii | |
| 8,896,793 B2* | 11/2014 | Hara | G02F 1/136277 349/139 |
| 2004/0105140 A1 | 6/2004 | Fujita | |
| 2009/0231532 A1 | 9/2009 | Yoshida | |
| 2010/0110359 A1 | 5/2010 | Lee et al. | |
| 2010/0320472 A1* | 12/2010 | Liu | G02F 1/136259 257/59 |

(Continued)

FOREIGN PATENT DOCUMENTS

| | | |
|---|---|---|
| JP | 2010-145454 A | 7/2010 |
| JP | 2010-185944 A | 8/2010 |

(Continued)

*Primary Examiner* — Julie Anne Watko
(74) *Attorney, Agent, or Firm* — Cantor Colburn LLP

(57) ABSTRACT

A liquid crystal display includes a first substrate, a gate line and a data line on the first substrate, a plurality of display pixels arranged in a row direction and a column direction of a matrix, on the first substrate, each display pixel including a pixel electrode and a common electrode on the first substrate and overlapping each other, and an insulating film between the pixel and common electrodes, a plurality of non-display dummy pixels at an edge of the matrix of display pixels; and a first common voltage line outside the matrix of display pixels and extending in the row direction.

13 Claims, 12 Drawing Sheets

(56) References Cited

U.S. PATENT DOCUMENTS

| | | | |
|---|---|---|---|
| 2011/0221989 A1* | 9/2011 | Lee | G02F 1/134309 349/41 |
| 2012/0218501 A1* | 8/2012 | Lee | G02F 1/134309 349/139 |
| 2013/0063673 A1* | 3/2013 | Choi | G02F 1/136227 349/43 |
| 2013/0148049 A1* | 6/2013 | Abe | G02F 1/136286 349/43 |
| 2015/0001540 A1* | 1/2015 | Chang | G09G 3/20 257/59 |
| 2015/0253637 A1* | 9/2015 | Shen | G02F 1/136209 257/72 |

FOREIGN PATENT DOCUMENTS

| | | |
|---|---|---|
| KR | 100476053 B1 | 3/2005 |
| KR | 1020090122738 A | 12/2009 |
| KR | 1020110118318 A | 10/2011 |
| KR | 101136318 B1 | 4/2012 |

* cited by examiner

LIQUID CRYSTAL DISPLAY

This application claims priority to Korean Patent Application No. 10-2013-0034891 filed on Mar. 29, 2013, and all the benefits accruing therefrom under 35 U.S.C. §119, the entire contents of which are incorporated herein by reference.

BACKGROUND (a) Field

The invention relates to a liquid crystal display, and more specifically to a liquid crystal display in which there is no signal delay while increasing the signal transmittance.

(b) Description of the Related Art

The liquid crystal display is one of the most common types of panel displays. The liquid crystal display is a display device which includes a liquid crystal layer in a display panel, and a voltage is applied to an electrode of the display panel to rearrange liquid crystal molecules of the liquid crystal layer and adjust an amount of light transmitted therethrough.

The liquid crystal display has a merit in relatively thinness, but the liquid crystal display has a drawback in that a side visibility is inferior to a front visibility thereof. Various types of alignments of the liquid crystal in the liquid crystal layer and driving methods thereof have been developed in order to overcome the drawback.

SUMMARY

One or more exemplary embodiment of the invention provides a liquid crystal display having advantages of forming two field generating electrodes on one substrate in a high resolution liquid crystal display and increasing the transmittance without having signal delay.

An exemplary embodiment of the invention provides a liquid crystal display including: a first substrate, a gate line and a data line on the first substrate, a plurality of display pixels arranged in a row direction and a column direction of a matrix, on the first substrate, each display pixel including a pixel electrode and a common electrode on the first substrate and overlapping each other, and an insulating film between the pixel and common electrodes, a plurality of non-display dummy pixels at an edge of the matrix of display pixels, and a first common voltage line outside the matrix of display pixels and extending in the row direction. The first common voltage line overlaps the plurality of non-display dummy pixels.

The liquid crystal display may further include a signal line outside the matrix of display pixels and connected to the common electrode.

The liquid crystal display may further include a second common voltage line outside the matrix of display pixels, extending in the row direction, and opposite to the first common voltage line with respect to the matrix of display pixels.

The first common voltage line and the second common voltage line may be in a same layer as the gate line.

The liquid crystal display may further include a third common voltage line outside the matrix of display pixels and extending in the column direction.

The third common voltage line may be in a same layer as the data line.

The liquid crystal display may further include a fourth common voltage line outside the matrix of display pixels, extending in the column direction, and opposite to the third common voltage line with respect to the matrix of display pixels.

The third common voltage line and the fourth common voltage line may be in a same layer as the data line.

Another exemplary embodiment of the invention provides a liquid crystal display including: a first substrate, a gate line and a data line on the first substrate, a plurality of pixels arranged in a row direction and a column direction of a matrix, on the first substrate, each pixel including a pixel electrode and a common electrode on the first substrate and overlapping each other, and an insulating film between the pixel and common electrodes, a first common voltage line outside the matrix of pixels and extending in the row direction, and a static electricity protection circuit between the first common voltage line and the matrix of pixels.

According to one or more exemplary embodiment of the invention, in the liquid crystal display, the common voltage line is not disposed in a display area in which the plurality of display pixels are disposed, but is disposed in a peripheral (e.g., non-display) area adjacent to the display area. A common voltage is transmitted through the common voltage line so that a signal delay of the common voltage may be reduced or effectively prevented, and decrease of transmittance may be reduced or effectively prevented.

According to one or more exemplary embodiment of the invention, the liquid crystal display transmits the common voltage without having the signal delay and reduces or effectively prevents deterioration of the transmittance.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

Figure 1:
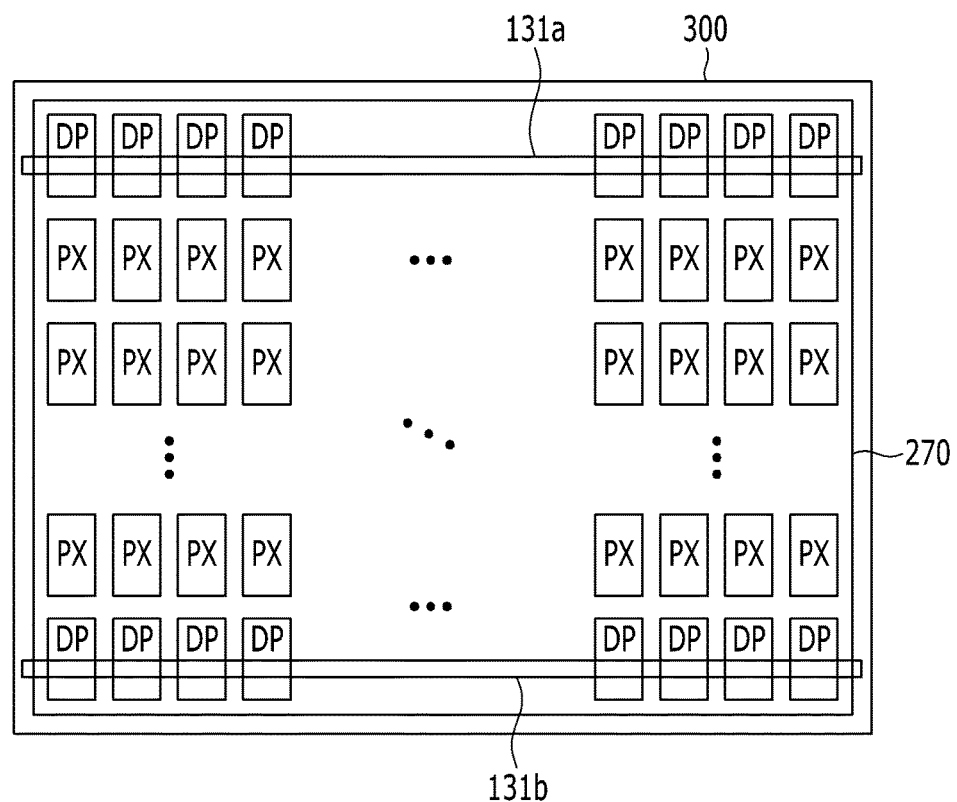
FIG. 1 is a schematic plan view of an exemplary embodiment of a liquid crystal display according to the invention.

The invention will be described more fully hereinafter with reference to the accompanying drawings, in which exemplary embodiments of the invention are illustrated. As those skilled in the art would realize, the described embodiments may be modified in various different ways, all without departing from the spirit or scope of the invention.

In the drawings, the thickness of layers, films, panels, regions, etc., are exaggerated for clarity. As used herein, connected may refer to elements being physically and/or electrically connected to each other. Like reference numerals designate like elements throughout the specification. As used herein, the term "and/or" includes any and all combinations of one or more of the associated listed items.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As a method of achieving a wide viewing angle, a liquid crystal display including a display panel in which field generating electrodes such as a pixel electrode and a common electrode are disposed on one single substrate of the display panel has been examined. The display panel may also include a common voltage line which applies a common voltage to the common electrode, in addition to a data line which transmits a data signal to the pixel electrode, where both field generating electrodes among the pixel electrode and the common electrode are on the one single substrate so that an aperture ratio of the liquid crystal display is reduced. The common voltage line and the common electrode may be connected to each other via a contact hole in a pixel or pixel area of the liquid crystal display.

As resolution of the liquid crystal display is increased, a size of each pixel or pixel area of the liquid crystal display is reduced. Consequently, the common voltage line and the contact hole which connects the common voltage line and the common electrode is disposed in one pixel or pixel area so that the aperture ratio of the liquid crystal display is undesirably and significantly lowered. Therefore, there remains a need for an improved liquid crystal display which achieves a wide viewing angle and reduces or effectively prevents a decrease in aperture ratio.

Exemplary embodiments of a liquid crystal display according to the invention will be described with reference to the drawings.

First, an exemplary embodiment of a liquid crystal display according to the invention will be described with reference to FIG. 1.

Referring to FIG. 1, a liquid crystal display 300 includes a display area in which a plurality of pixels PX are arranged in a matrix to display an image, a plurality of dummy pixels DP disposed along one or more edge of the matrix of pixels PX, a common electrode 270 disposed on substantially an entire region in which the plurality of pixels PX and the plurality of dummy pixels DP are disposed, and a first common voltage line 131a and a second common voltage line 131b disposed to overlap the dummy pixels DP.

Even though not illustrated, a gate line, a data line, a switching element and a pixel electrode are disposed in each pixel PX. These elements will be described in detail below with reference to FIG. 2 and FIG. 3.

The plurality of dummy pixels DP is additional pixels which do not display an image.

Specifically, sizes of the plurality of dummy pixels DP may be substantially equal to or slightly smaller than the size of the pixel PX. Dimensions defining the size of a dummy pixel PX may include a length or a width taken in the plan view of the liquid crystal display 300. Similar to the pixel PX, a gate line, a data line, and a switching element such as a thin film transistor which is connected to the gate line and the data line are disposed in each of the plurality of dummy pixels DP. Different from the pixel PX, the pixel electrode connected to the switching element may be omitted in each dummy pixel DP so that the image is not displayed thereby. The dummy pixel DP serves to block an initial noise which may occur from an external signal line transmitting a gate signal or a data signal to the plurality of pixels PX, to reduce or effectively prevent the external noise from being transmitted to the pixels PX which display the image. The external signal is firstly transmitted to the dummy pixel DP, and then transmitted to each pixel PX which displays the image. Therefore, even though the initial noise which may occur in the external signal is transmitted to the dummy pixel DP, the dummy pixel DP does not display the image so that the display quality of the liquid crystal display 300 is not negatively affected.

Even though not illustrated, the plurality of dummy pixels DP may overlap a light blocking member.

The matrix of pixels PX includes pixel rows lengthwise extending in a row direction, and pixel columns lengthwise extending in a column direction. The plurality of dummy pixels DP are disposed along a row direction of the plurality of pixels PX, and the first common voltage line 131*a* and the second common voltage line 131*b* are also disposed along the row direction of the plurality of pixels PX.

The first common voltage line 131*a* and the second common voltage line 131*b* are connected to the common electrode 270 through a contact hole defined in the liquid crystal display 300 (not illustrated) and apply a common voltage to the common electrode 270.

The display area of the liquid crystal display 300 has a planar dimension or size such that an overall length of the row direction in which the plurality of pixels PX are disposed is larger than an overall length of the column direction in which the plurality of pixels PX are disposed.

Therefore, if the first common voltage line 131*a* and the second common voltage line 131*b* are disposed extending in the column direction in which the plurality of pixels PX are disposed, an interval between the first common voltage line 131*a* and the second common voltage line 131*b* is larger than when the first common voltage line 131*a* and the second common voltage line 131*b* are disposed extending in the row direction in which the plurality of pixels PX are disposed. A signal delay of the common voltage transmitted due to a relatively larger interval between the first common voltage line 131*a* and the second common voltage line 131*b* is greater than a signal delay of the common voltage which occurs when the interval between the first common voltage line 131*a* and the second common voltage line 131*b* is relatively small.

According to the exemplary embodiment of the invention, in the liquid crystal display 300, since the first common voltage line 131*a* and the second common voltage line 131*b* extend along the row direction in which the plurality of pixels PX are disposed, the signal delay of the transmitted common voltage may be reduced.

Further, the first common voltage line 131*a* and the second common voltage line 131*b* are not disposed in the display area in which the plurality of pixels PX are disposed so that deterioration of the aperture ratio in the display area may be reduced or effectively prevented.

Further, the first common voltage line 131*a* and the second common voltage line 131*b* overlap the dummy pixels DP disposed along one or more edge of the matrix of pixels PX so that an additional space for the first common voltage line 131*a* and the second common voltage line 131*b* is not required, and deterioration of the aperture ratio of the liquid crystal display 300 is further reduced or effectively prevented.

Figure 2:
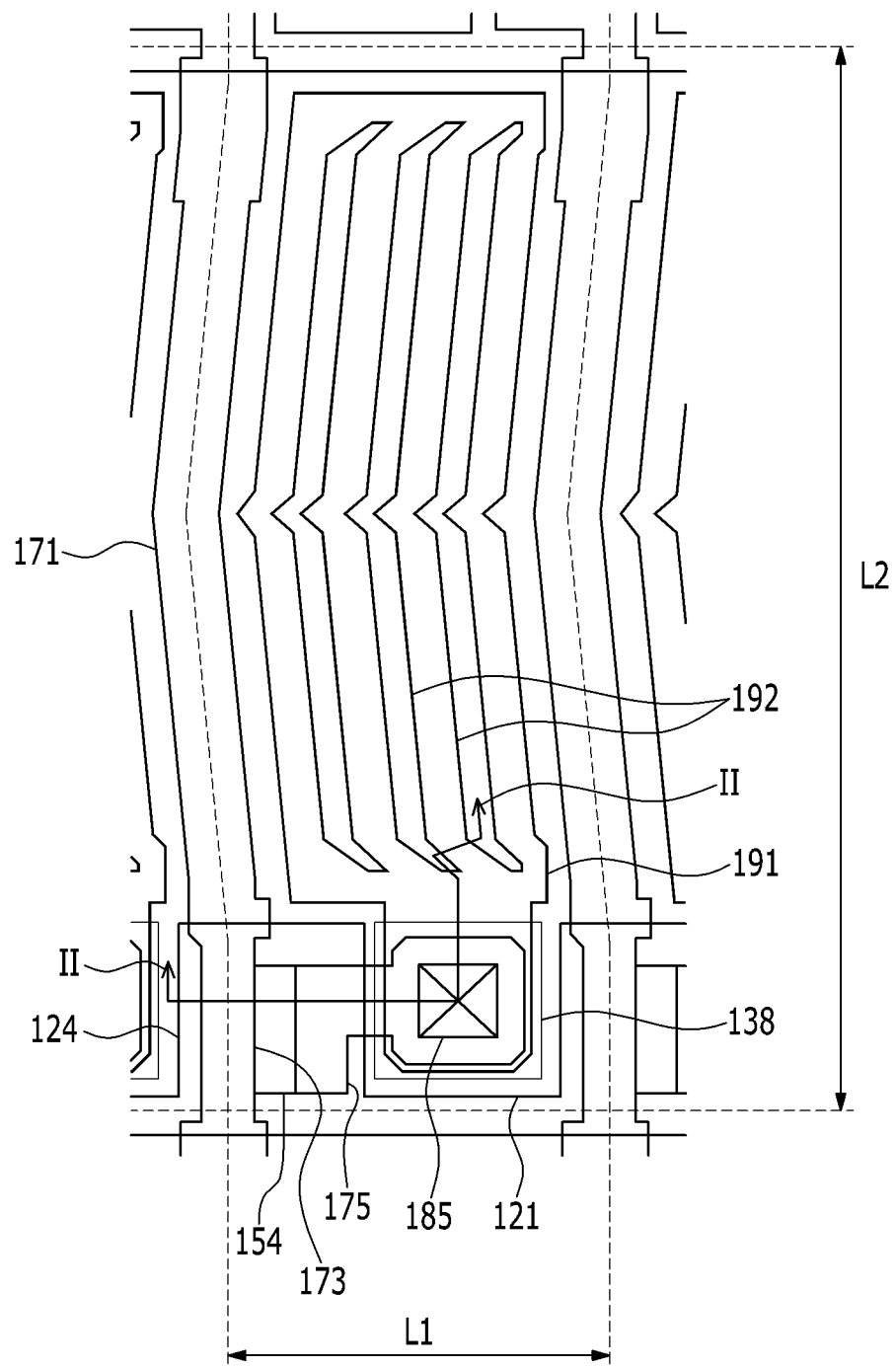
FIG. 2 is a plan view of an exemplary embodiment of one pixel in a display area of the liquid crystal display according to the invention.
Figure 3:
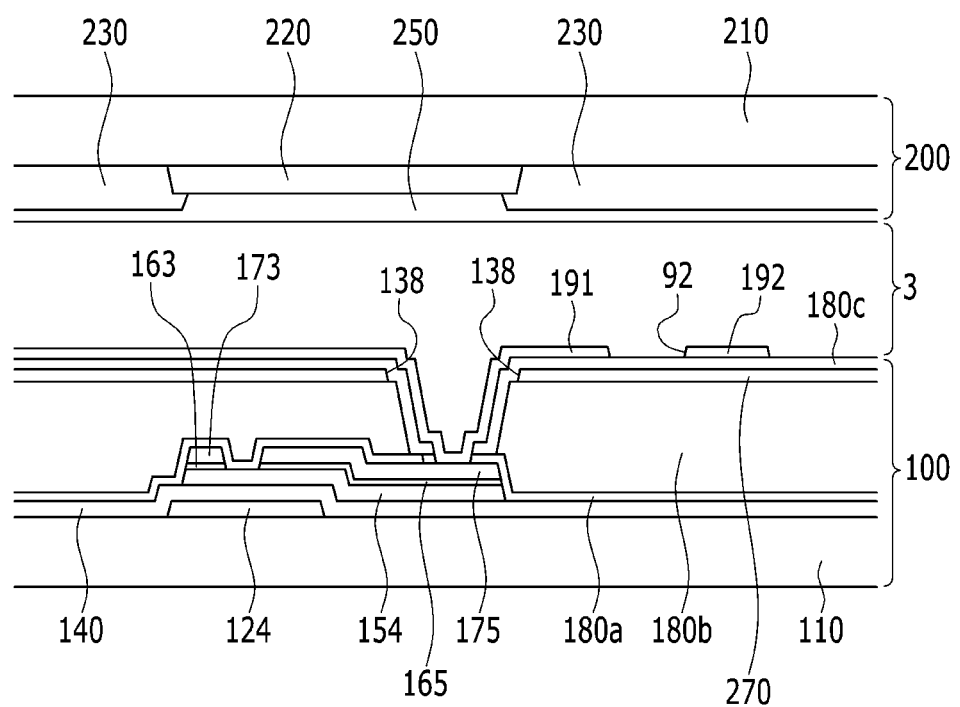
FIG. 3 is a cross-sectional view of the liquid crystal display of FIG. 2 taken along line II-II.

Now, with reference to FIG. 2 and FIG. 3 in addition to FIG. 1, a pixel in the display area of the liquid crystal display according to the invention will be more specifically described. FIG. 2 is a plan view of an exemplary embodiment of a pixel which is disposed in the display area of the liquid crystal display according to the invention, and FIG. 3 is a cross-sectional view of the liquid crystal display of FIG. 2 taken along line II-II.

Referring to FIG. 2 and FIG. 3, the liquid crystal display 300 according to the invention includes a lower panel 100 and an upper panel 200 facing each other, and a liquid crystal layer 3 disposed between the lower panel 100 and the upper panel 200. Hereinbelow, one pixel will be described as an example, but the liquid crystal display according to the invention may have a resolution of 200 pixels per inch ("PPI") or higher, more specifically, approximately 250 PPI. That is, in a planar region of one inch in length and width of the liquid crystal display 300, approximately, 200 or more, and more specifically, approximately 250 or more pixels may be included therein. Further, an overall horizontal length L1 of the one pixel of the liquid crystal display 300 according to the invention may be approximately 40 micrometers (μm) or less, and an overall vertical length L2 may be approximately 120 μm or less. Here, as illustrated with dotted lines in FIG. 2, the horizontal length L1 of the pixel is an interval between vertical center portions of two adjacent data lines 171 and the vertical length L2 of the pixel is an interval between horizontal center portions of two adjacent gate lines 121.

First, the lower panel 100 will be described.

A gate conductor including the gate line 121 is disposed on a single first insulation substrate 110 which may include transparent glass or plastic.

A gate line 121 includes one or more a gate electrode 124 protruding from a main portion thereof, and a wide distal end portion (not illustrated) for connection to another layer and/or an external driving circuit. The gate line 121 may include an aluminum based metal such as aluminum (Al) or an aluminum alloy, a silver based metal such as silver (Ag) or a silver alloy, a copper based metal such a copper (Cu) or a copper alloy, a molybdenum based metal such as molybdenum (Mo) or a molybdenum alloy, chromium (Cr), tantalum (Ta) and titanium (Ti). The gate line 121 may have a single layer structure, or a multilayer structure including at least two conductive layers having different physical properties from each other.

A gate insulating layer 140 including silicon nitride (SiNx) or silicon oxide (SiOx) is disposed on the gate conductor 121 and 124. The gate insulating layer 140 may have a single layer structure, or a multilayer structure including at least two insulating layers having different physical properties from each other.

A semiconductor 154 including amorphous silicon or polysilicon is disposed on the gate insulating layer 140. The semiconductor 154 may include an oxide semiconductor.

Ohmic contacts 163 and 165 are disposed on the semiconductor 154. The ohmic contacts 163 and 165 may include a material such as n+ hydrogenated amorphous silicon in which an n-type impurity such as phosphorus is doped at a high concentration, or silicide. The ohmic contacts 163 and 165 form a pair of ohmic contacts disposed on the semiconductor 154. In an alternative exemplary embodiment, if the semiconductor 154 includes oxide semiconductor, the ohmic contacts 163 and 165 may be omitted.

A data conductor including the data lines 171 each including one or more source electrode 173 protruding from a main portion thereof, and a drain electrode 175 are disposed on the ohmic contacts 163 and 165 and the gate insulating layer 140. A portion of the semiconductor 154 may be exposed between facing source and drain electrodes 173 and 175.

The data line 171 includes a wide distal end portion (not illustrated) for connection with another layer and/or an external driving circuit. The data line 171 transmits the data signal and mainly extends in the vertical direction to intersect the gate line 121 which mainly extends in the horizontal direction.

In the illustrated exemplary embodiment shown in FIG. 2, the data line 171 may include a bent portion in order to obtain maximum transmittance of the liquid crystal display 300. A first inclined portion of the data line 171 may extend from an area of the gate electrode 124 at the bottom of the pixel and towards a center region of the pixel. A second inclined portion of the data line 171 may extend from the center region of the pixel and towards an area of another gate electrode 124 at the top of the pixel. The inclined portions meet at the center region of the pixel to form a V-shape at the bent portion. The first and second inclined portions of the data line 171 form a predetermined angle with each other at the center region of the pixel.

The source electrode 173 is continuous with the data line 171 and lengthwise extends in the vertical direction such that the source electrode 173 is disposed on the same virtual line as the data line 171, for example, as illustrated by the dotted line center line in FIG. 2. A portion of the drain electrode 175 lengthwise extends parallel to the source electrode 173. Therefore, the drain electrode 175 is parallel to the source electrode 173 part of the data line 171.

The gate electrode 124, the source electrode 173 and the drain electrode 175 form a thin film transistor ("TFT") together with the exposed portion of the semiconductor 154, and a channel of the TFT is formed by the exposed portion of the semiconductor 154 between the source electrode 173 and the drain electrode 175.

The exemplary embodiment of the liquid crystal display 300 according to the invention includes the source electrode 173 part of the data line 171 and the drain electrode 175 each extending parallel to a lengthwise direction of the data line 171 so that a width dimension of the TFT is increased without increasing a planar area of the data conductor 171 and 173, and thus the aperture ratio of the liquid crystal display 300 is increased.

The data line 171 and the drain electrode 175 may include a refractory metal such as molybdenum, chromium, tantalum and titanium, or an alloy thereof. The data line 171 and the drain electrode 175 may have single layer structure, or a multilayer structure which includes the refractory metal film (not illustrated) and a low resistance conductive layer (not illustrated). Exemplary embodiments of the multilayer structure include a double layer of a chromium or molybdenum (alloy) lower layer and an aluminum (alloy) upper layer, or a triple layer of the molybdenum (alloy) lower layer, an aluminum (alloy) intermediate layer, and the molybdenum (alloy) upper layer. The data line 171 and the drain electrode 175 are not limited to the above-described materials, and in alternative exemplary embodiments, the data line 171 and the drain electrode 175 may include other various metals or conductors. A width of the data line 171 may be approximately 3.5 µm to about 0.75 µm in the vertical direction.

A first passivation layer 180a is disposed on the data conductors 171, 173 and 175, the gate insulating layer 140 and the exposed portion of the semiconductor 154. The first passivation layer 180a may include an organic insulating material or an inorganic insulating material.

A second passivation layer 180b is disposed on the first passivation layer 180a. In an alternative exemplary embodiment, the second passivation layer 180b may be omitted. The second passivation layer 180b may be a color filter or a color filter layer, but is not limited thereto. If the second passivation layer 180b is a color filter, the second passivation layer 180b may display one of primary colors such as three primary colors of red, green and blue or yellow, cyan and magenta. Even though not illustrated, the color filter or color filter layer may further include a color filter which displays a mixed color of the primary colors or white, in addition to the primary colors.

The common electrode 270 is disposed on the second passivation layer 180b. The common electrode 270 is disposed on the entire surface of the first insulation substrate 110 such as to be plate-shaped or a planar element. An opening 138 is defined in the common electrode 270 and disposed in a region corresponding to the periphery of the drain electrode 175 in the plan view. That is, the common electrode 270 may have a substantially planar shape in the plan view.

One single, unitary, indivisible common electrode 270 or a plurality of discrete common electrodes 270 connected to each other, and corresponding to adjacent pixels is supplied with a common voltage from the first common voltage line 131a and a second common voltage line 131b disposed outside the display area.

The one or more common electrode 270 has a substantially planar shape in the plan view and continuous across a plurality of pixels so that the one or more common electrode 270 overlaps the data line 171. Where the common electrode 270 overlaps the data line 171, a crosstalk may be caused due to the common voltage applied to the common electrode 270 and a data voltage applied to the data line 171. However, in the illustrated exemplary embodiment of the liquid crystal display according to the invention, the second passivation layer 180b including an organic material is disposed between the data line 171 and the common electrode 270, and a cross-sectional thickness of the second passivation layer 180b is relatively large compared to that of the data line 171 and the common electrode 270 on the single first insulation substrate 110. Therefore, crosstalk due to the common voltage applied to the common electrode 270 and the data voltage applied to the data line 171 may be reduced or effectively prevented.

A third passivation layer 180c is disposed on the common electrode 270. The third passivation layer 180c may include an organic insulating material or an inorganic insulating material.

A pixel electrode 191 is disposed on the third passivation layer 180c. The pixel electrode 191 includes a curved edge in the plan view which is substantially parallel to the curved edge formed by the first inclined portion and the second inclined portion of the data line 171. A plurality of first cutouts 92 is defined in the pixel electrode 191, and a plurality of first branch electrodes 192 of the pixel electrode 191 is defined by the plurality of the first cutouts 92.

A first contact hole 185 is defined in the first passivation layer 180a, the second passivation layer 180b and the third passivation layer 180c and exposes the drain electrode 175. The first contact hole 185 is formed in the opening 138 of the common electrode 270.

The pixel electrode 191 is physically and electrically connected to the drain electrode 175 through the first contact hole 185 so as to be supplied with the voltage from the drain electrode 175.

Even though not illustrated, an alignment layer is disposed on the pixel electrode 191 and the third passivation layer 180c, such as adjacent to the liquid crystal layer 3. The alignment layer may be a horizontal alignment layer and rubbed in a predetermined direction. However, in an alternative exemplary embodiment of the invention, instead of a rubbed alignment layer, the alignment layer includes a photo reaction material which is optically aligned in a manufacturing process of the liquid crystal display.

Now, the upper panel 200 will be described.

A light blocking member 220 is disposed on a second insulation substrate 210 which includes transparent glass or plastic. The light blocking member 220 may also be referred to as a black matrix and reduces or effectively prevents light leakage. Even though not illustrated, the light blocking member 220 may be disposed in area corresponding to the dummy pixel DP.

The upper panel 200 may further include a color filter layer including a plurality of color filters 230 disposed on the second insulation substrate 210. If the second passivation layer 180b of the lower panel 100 is a color filter, the color filter layer or the color filter 230 of the upper panel 200 may be omitted. The light blocking member 220 of the upper panel 200 may be also disposed on the lower panel 100, in addition to or instead of the upper panel 200.

An overcoat 250 is disposed on the color filter 230 and the light blocking member 220. The overcoat 250 includes an (organic) insulating material, reduces or effectively prevents exposure of the color filter 230 and provides a substantially flat surface. In an alternative exemplary embodiment, the overcoat 250 may be omitted.

The alignment layer may be further disposed on the overcoat 250.

The liquid crystal layer 3 includes a nematic liquid crystal material having a positive dielectric anisotropy. Liquid crystal molecules of the liquid crystal layer 3 has a structure in that the major axis thereof is parallel to the display panels 100 and 200, and the direction of the liquid crystal molecules is spirally twisted at 90 degree from the rubbing direction of the alignment layer of the lower panel 100 to the upper panel 200.

The pixel electrode 191 is supplied with the data voltage from the drain electrode 175, and the common electrode 270 is supplied with a reference voltage from the first common voltage line 131a and the second common voltage line 131b disposed outside the display area.

The pixel electrode 191 and the common electrode 270 are field generating electrodes which generate an electric field in the liquid crystal layer 3 so as to rotate the liquid crystal molecules of the liquid crystal layer 3 disposed on the two electrodes 191 and 270 in a direction substantially parallel to a direction of the electric field. The polarization of the light which passes through the liquid crystal layer 3 is varied depending on the rotational direction of the liquid crystal molecules determined as described above.

The structure of an exemplary embodiment of one pixel in the display area of the liquid crystal display has been described above with reference to FIG. 2 and FIG. 3, but the invention is not limited thereto, and the liquid crystal display according to the invention may include any of a number of pixel structures in which the pixel electrode and the common electrode are disposed on only one substrate.

Figure 4:
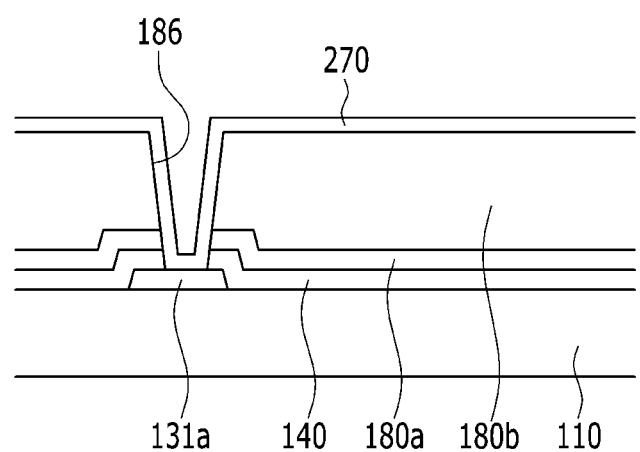
FIG. 4 is a cross-sectional view illustrating an exemplary embodiment of a connection relationship between a common voltage line and a common electrode of the liquid crystal display illustrated in FIG. 1 according to the invention.

Now, a connection relationship of the common voltage line and the common electrode of the liquid crystal display according to the invention will be described with reference to FIG. 4 together with FIG. 1 to FIG. 3. FIG. 4 is a cross-sectional view illustrating an exemplary embodiment of a connection relationship of the common voltage line and the common electrode of the liquid crystal display illustrated in FIG. 1 according to the invention.

Referring to FIG. 4, a first common voltage line 131a is disposed extending along the pixel PX row direction and overlapping the plurality of dummy pixels DP disposed along edges of the matrix plurality of pixels PX. The first common voltage line 131a is in and/or on a same layer as the gate conductor 121 and 124, and in an exemplary embodiment of a manufacturing process of the liquid crystal display 300, the first common voltage line 131a is formed simultaneously with the gate conductor 121 and 124. The gate insulating layer 140, the first passivation layer 180a and the second passivation layer 180b are sequentially disposed on the first common voltage line 131a in this order. The common electrode 270 is disposed on the second passivation layer 180b. A plurality of second contact holes 186 is defined in the gate insulating layer 140, the first passivation layer 180a and the second passivation layer 180b and exposes the first common voltage line 131a. The common electrode 270 is connected to the first common voltage line 131a through the second contact hole 186. One second contact hole 186 may be defined on each of the plurality of dummy pixels DP, but the invention is not limited thereto. In another exemplary embodiment, the number of second contact holes 186 may be less than the number of the plurality of dummy pixels DP.

Even though not illustrated, the connection relationship of the second common voltage line 131b and the common electrode 270 is the same as the connection relationship illustrated in FIG. 4. Specifically, the gate insulating layer 140, the first passivation layer 180a and the second passivation layer 180b are sequentially disposed on the second common voltage line 131b in this order, and the common electrode 270 disposed on the second passivation layer 180b is connected to the second common voltage line 131b through a contact hole defined in the gate insulating layer 140, the first passivation layer 180a and the second passivation layer 180b.

Figure 5:
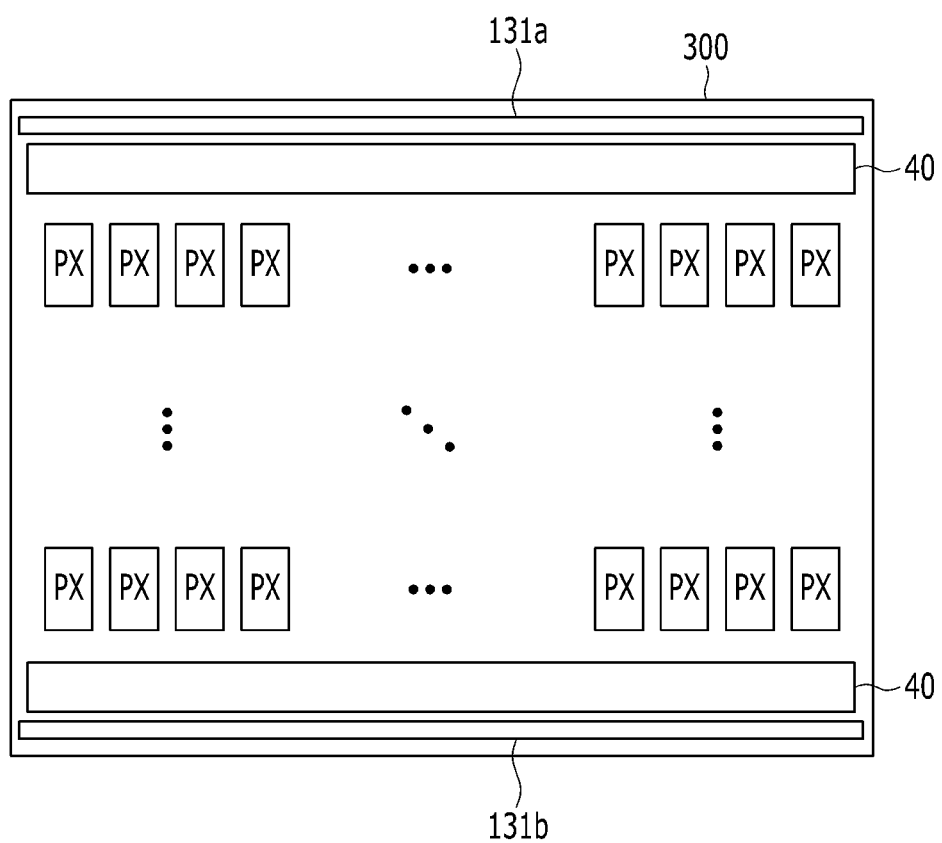
FIG. 5 is a schematic plan view of another exemplary embodiment of a liquid crystal display according to the invention.
Figure 6:
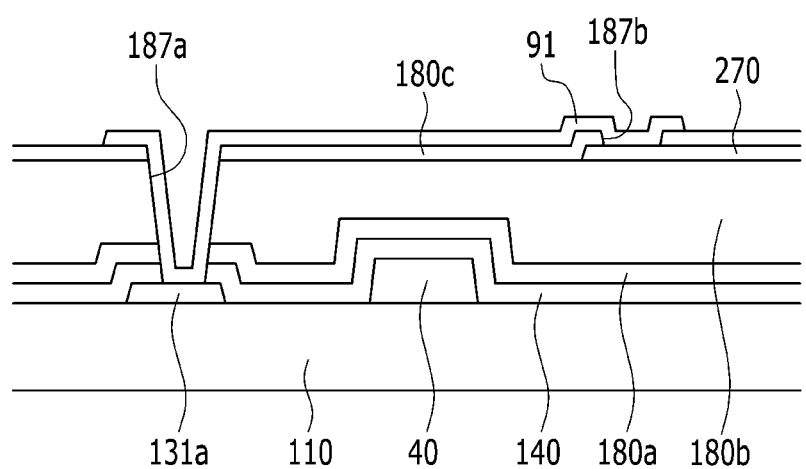
FIG. 6 is a cross-sectional view illustrating an exemplary embodiment of a connection relationship between a common voltage line and a common electrode of the liquid crystal display illustrated in FIG. 5 according to the invention.

Now, another exemplary embodiment of a liquid crystal display according to the invention will be described with reference to FIG. 5 and FIG. 6 together with FIG. 1 to FIG. 3. FIG. 5 is a schematic plan view of another exemplary embodiment of a liquid crystal display according to the invention and FIG. 6 is a cross-sectional view illustrating an exemplary embodiment of a connection relationship between a common voltage line and a common electrode of the liquid crystal display illustrated in FIG. 5 according to the invention.

Referring to FIG. 5, the liquid crystal display 300 includes a display area in which a plurality of pixels PX arranged in a matrix are disposed to display an image, a static electricity protection circuit portion 40 disposed at an edge of the display area, and a first common voltage line 131a and a second common voltage line 131b disposed at an outer border of the static electricity protection circuit portion 40.

Even though not illustrated, similar to the exemplary embodiment illustrated in FIG. 1, the liquid crystal display 300 includes a common electrode (not illustrated) which is disposed on substantially an entire surface of the region in which the plurality of pixels PX is disposed Even though not illustrated, a gate line, a data line, a switching element and a pixel electrode are disposed in each pixel PX. The detailed description thereof has been made with reference to FIG. 2 and FIG. 3 and thus the redundant description will be omitted.

The first common voltage line 131a and the second common voltage line 131b are disposed extending along the row direction of the plurality of pixels PX.

The first common voltage line 131a and the second common voltage line 131b are connected to the common electrode 270 through a contact hole (not illustrated) and apply a common voltage to the common electrode 270.

According to the exemplary embodiment of the liquid crystal display according to the invention, the first common voltage line 131a and the second common voltage line 131b are disposed so as to extend along the row direction in which the plurality of pixels PX are disposed to reduce the signal delay of the common voltage.

Further, the first common voltage line 131a and the second common voltage line 131b are disposed in a peripheral area adjacent to the display area in which the plurality of pixels PX is disposed so that the first common voltage line 131a and the second common voltage line 131b are not disposed in the display area. Therefore, decrease of the aperture ratio due to the common voltage lines 131a and 131b in the display area may be reduced or effectively prevented.

Now, the connection relationship of the common voltage lines 131a and 131b and the common electrode 270 of the liquid crystal display 300 will be described with reference to FIG. 6.

Referring to FIG. 6, the static electricity protection circuit portion 40 is disposed between the matrix of the plurality of pixels PX and the first common voltage line 131a extending along the row direction of the plurality of pixels PX, in the plan view. Detailed description of the static electricity protection circuit portion 40 will be omitted.

The first common voltage line 131a is in and/or on a same layer as the gate conductor 121 and 124. The gate insulating layer 140, the first passivation layer 180a and the second passivation layer 180b are sequentially disposed on the first common voltage line 131a in this order. The common electrode 270 is disposed on the second passivation layer 180b. The third passivation layer 180c is disposed on the common electrode 270. A plurality of third contact holes 187a is defined in the gate insulating layer 140, the first passivation layer 180a, the second passivation layer 180b and the third passivation layer 180c to expose the first common voltage line 131a, and a plurality of fourth contact holes 187b is defined in the third passivation layer 180c to expose the common electrode 270.

A first connecting member 91 is disposed on and in the third contact hole 187a and the fourth contact hole 187b. The first connecting member 91 is in and/or on a same layer as the pixel electrode 191 illustrated in FIG. 2 and FIG. 3.

The first common voltage line 131a exposed through the third contact hole 187a is connected to the common electrode 270 exposed through the fourth contact hole 187b, by the first connecting member 91.

Even though not illustrated, the connection relationship of the second common voltage line 131b and the common electrode 270 is the same as the connection relationship illustrated in FIG. 6. Specifically, the gate insulating layer 140, the first passivation layer 180a and the second passivation layer 180b are sequentially disposed on the second common voltage line 131b in this order, the common electrode 270 is disposed on the second passivation layer 180b, and the third passivation layer 180c is disposed on the common electrode 270. A plurality of contact holes is defined in the gate insulating layer 140, the first passivation layer 180a, the second passivation layer 180b and the third passivation layer 180c to expose the second common voltage line 131b, and a plurality of contact holes is defined in the third passivation layer 180c to expose the common electrode 270. The first common voltage line 131a and the common electrode 270 which are exposed by the contact holes are connected to each other through a connecting member (not illustrated), which is in and/or on a same layer as the pixel electrode 191, similar to the first connecting member 91 illustrated in FIG. 6.

Many features of the exemplary embodiment of the liquid crystal display which have been described with reference to FIG. 1 to FIG. 4 may be applied to the exemplary embodiment of the liquid crystal display illustrated in FIGS. 5 and 6.

Figure 7:
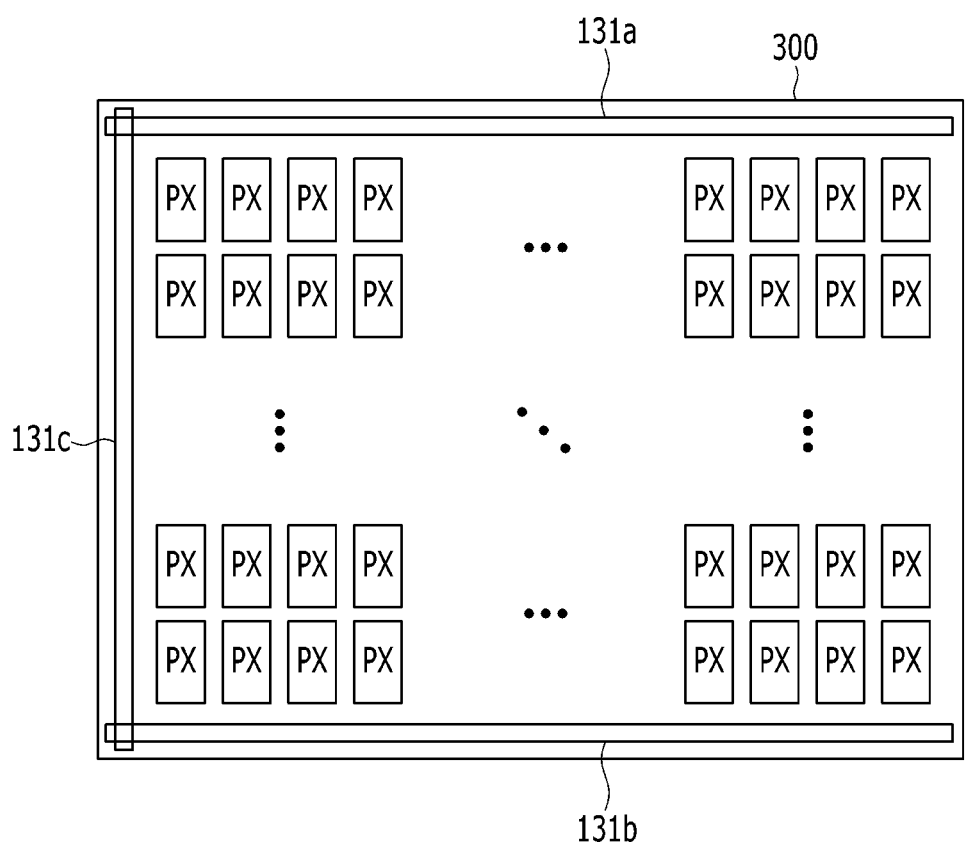
FIG. 7 is a schematic plan view of still another exemplary embodiment of a liquid crystal display according to the invention.
Figure 8:
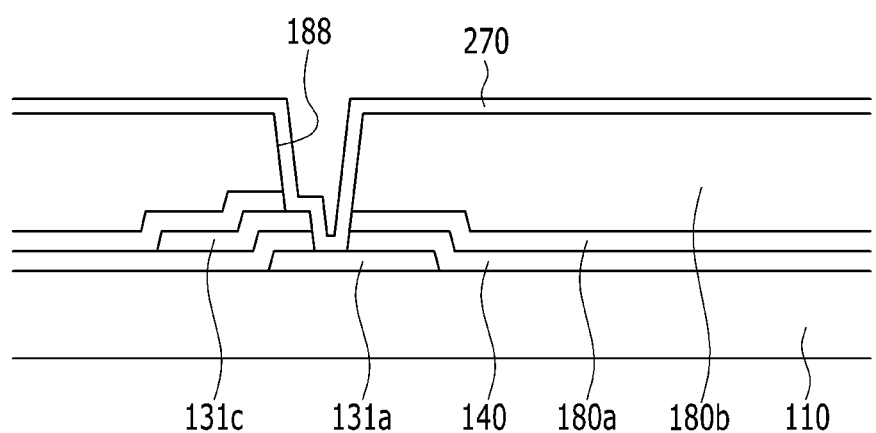
FIG. 8 is a cross-sectional view illustrating an exemplary embodiment of a connection relationship between a common voltage line and a common electrode of the liquid crystal display illustrated in FIG. 7 according to the invention.

Now, still another exemplary embodiment of a liquid crystal display according to the invention will be described with reference to FIG. 7 and FIG. 8. FIG. 7 is a schematic plan view of still another exemplary embodiment of a liquid crystal display according to the invention and FIG. 8 is a cross-sectional view illustrating an exemplary embodiment of a connection relationship between common voltage lines of the liquid crystal display illustrated in FIG. 7 according to the invention.

Referring to FIG. 7, the liquid crystal display 300 further includes a third common voltage line 131c extending along the column direction of the plurality of pixels PX, which is different from the liquid crystal display 300 embodiment illustrated in FIG. 1. More specifically, the liquid crystal display 300 further includes the third common voltage line 131c extending along the column direction of the plurality of pixels PX in addition to the first common voltage line 131a and the second common voltage line 131b extending along the row direction of the plurality of pixels PX.

As described above, the first common voltage line 131a and the second common voltage line 131b are disposed in and/or on a same layer as the gate conductor 121 and 124 in the plurality of pixels PX, and the third common voltage line 131c is disposed in and/or on a same layer as the data conductor 171, 173 and 175 in the plurality of pixels PX.

Now, with reference to FIG. 8, the connection relationship of the first common voltage line 131a, the second common voltage line 131b and the third common voltage line 131c will be described.

Referring to FIG. 8, the first common voltage line 131a disposed in and/or on the same layer as the gate conductor 121 and 124 is disposed on the first insulation substrate 110. The gate insulating layer 140 is disposed on the first common voltage line 131a, the third common voltage line 131c is disposed on the gate insulating layer 140, the first passivation layer 180a and the second passivation layer 180b are sequentially disposed on the third common voltage line 131c, and the common electrode 270 is disposed on the second passivation layer 180b.

A first cross-sectional portion of a fifth contact hole 188 is defined in the gate insulating layer 140, the first passivation layer 180a and the second passivation layer 180b to expose a part of the first common voltage line 131a, and a second cross-sectional portion the fifth contact hole 188 is defined in the first passivation layer 180a and the second passivation layer 180b to expose the third common voltage line 131c in a different layer than the first common voltage line 131a. That is, the common electrode 270 is connected to the first common voltage line 131a and the third common voltage line 131c through the same fifth contact hole 188 which simultaneously exposes the first common voltage line 131a and the third common voltage line 131c.

Even though it is described that the common electrode 270 is connected to the first common voltage line 131a and the third common voltage line 131c through one single contact hole which simultaneously exposes the first common voltage line 131a and the third common voltage line 131c, the invention is not limited thereto. In an alternative exemplary embodiment of the invention, a contact hole exposing the first common voltage line 131a and a separate contact hole exposing the third common voltage line 131c are individually defined so that the common electrode 270 may be connected to the first common voltage line 131a and the third common voltage line 131c through the respective contact holes.

Even though not illustrated, the connection relationship of the second common voltage line 131b and the third common voltage line 131c is the same as the connection relationship illustrated in FIG. 8, or described with respect to the alternative exemplary embodiment including separate contact holes.

Many features of the exemplary embodiment of the liquid crystal display which is described above with reference to FIG. 1 to FIG. 4 and many features of the exemplary embodiment of the liquid crystal display which is described above with reference to FIG. 5 and FIG. 6 may be applied to the exemplary embodiment of the liquid crystal display illustrated in FIGS. 7 and 8.

Figure 9:
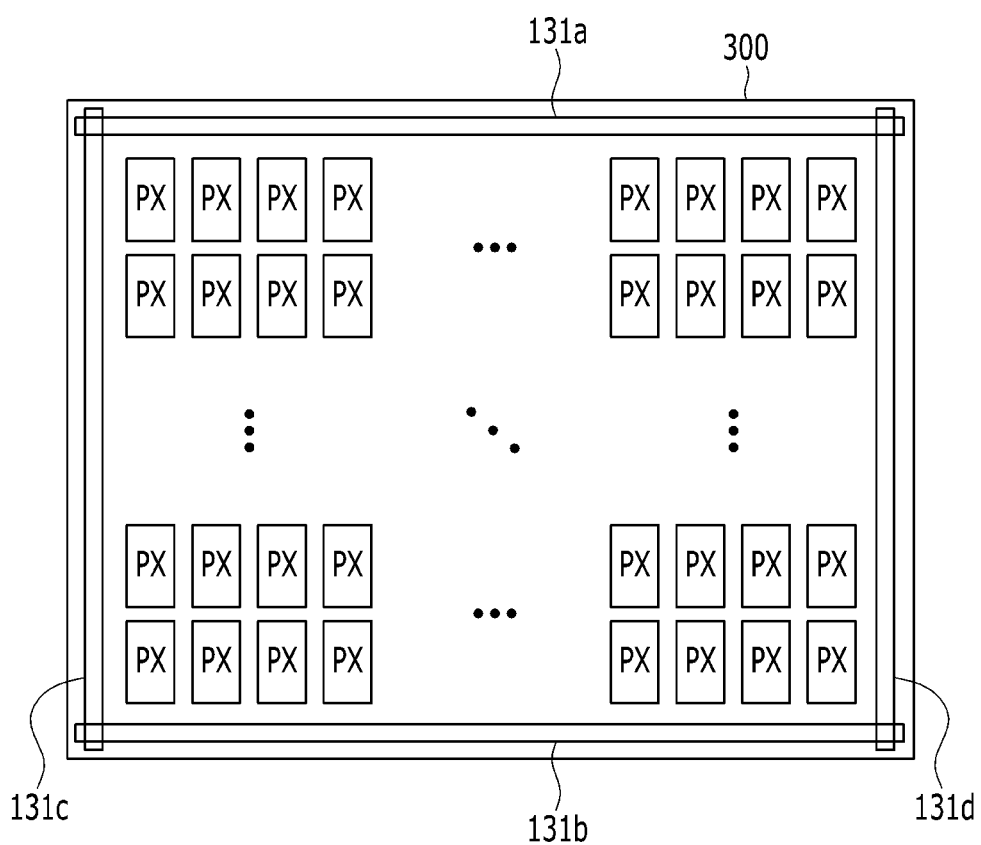
FIG. 9 is a schematic plan view of yet another exemplary embodiment of a liquid crystal display according to the invention.

Now, with reference to FIG. 9, yet another exemplary embodiment of a liquid crystal display according to the invention will be described. FIG. 9 is a schematic plan view of yet another exemplary embodiment of a liquid crystal display according to the invention.

Referring to FIG. 9, the liquid crystal display 300 is similar to the liquid crystal display 300 illustrated in FIG. 1, FIG. 5 and FIG. 7.

However, the liquid crystal display 300 according illustrated in FIG. 9 further includes a fourth common voltage line 131d extending along the column direction of the plurality of pixels PX and disposed opposite to the third common voltage line 131c with the display area therebetween. More specifically, in addition to the first common voltage line 131a and the second common voltage line 131b which extend along the row direction of the plurality of pixels PX, the liquid crystal display further includes the third common voltage line 131c and the fourth common voltage line 131d which each extends in the column direction of the plurality of pixels PX.

As described above, the first common voltage line 131a and the second common voltage line 131b are disposed in and/or on a same layer as the gate conductor 121 and 124 in the plurality of pixels PX, and the third common voltage line 131c and the fourth common voltage line 131d are disposed in and/or on a same layer as the data conductor 171, 173 and 175 in the plurality of pixels PX.

As described with reference to FIG. 8, the third common voltage line 131c and the fourth common voltage line 131d which are disposed in and/or on the same layer as the data conductor 171, 173 and 175, and the first common voltage line 131a and the second common voltage line 131b which are disposed in and/or on the same layer as the gate conductor 121 and 124 may be connected to the common electrode 270 through one single contact hole or different contact holes.

Many features of the exemplary embodiment of the liquid crystal display which is described above with reference to FIG. 1 to FIG. 4, many features of the exemplary embodiment of the liquid crystal display according which is described above with reference to FIG. 5 to FIG. 6, and many features of the exemplary embodiment of the liquid crystal display which is described above with reference to FIG. 7 and FIG. 8 may be applied to the liquid crystal display illustrated in FIG. 9.

Figure 10:
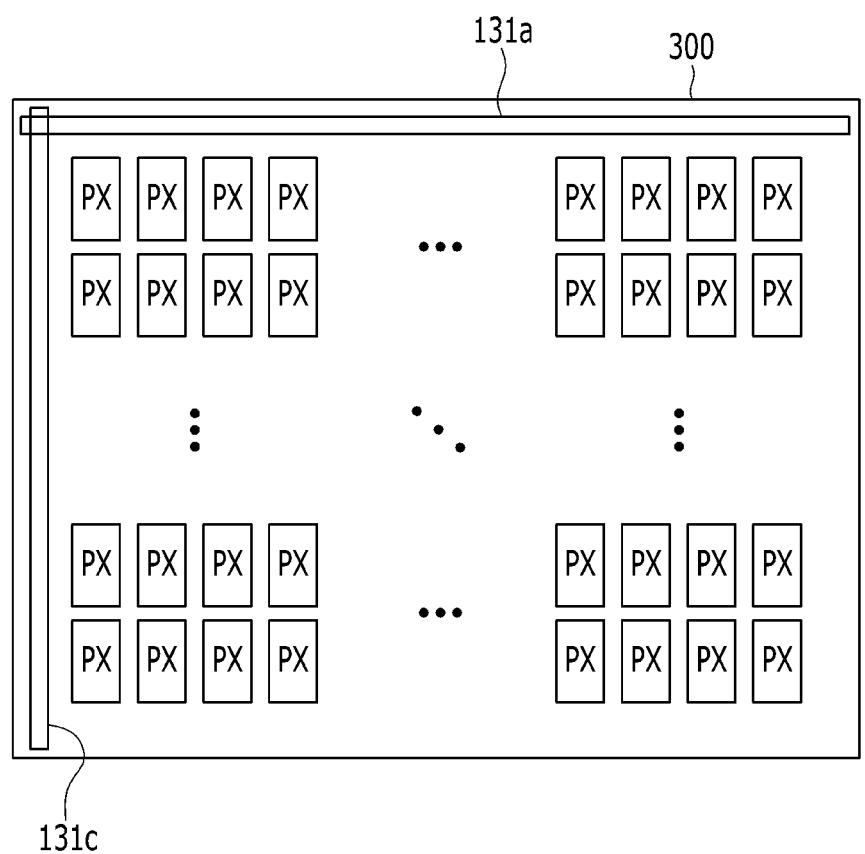
FIG. 10 is a schematic plan view of still another exemplary embodiment of a liquid crystal display according to the invention.

Now, with reference to FIG. 10, still another exemplary embodiment of a liquid crystal display according to the invention will be described. FIG. 10 is a schematic plan view of still another exemplary embodiment of a liquid crystal display according to the invention.

Referring to FIG. 10, the liquid crystal display 300 is similar to the exemplary embodiments of the liquid crystal display 300 illustrated in FIG. 1, FIG. 5, FIG. 7 and FIG. 9.

However, the liquid crystal display 300 illustrated in FIG. 10 includes a first common voltage line 131a which extends along the row direction of the plurality of pixels PX and a third common voltage line 131c which extends in the column direction of the plurality of pixels PX.

As described above, the first common voltage line 131a is disposed in and/or on same layer as the gate conductor 121 and 124 in the plurality of pixels PX and the third common voltage line 131c is disposed in and/or on a same layer as the data conductor 171, 173 and 175 in the plurality of pixels PX.

As described with reference to FIG. 8, the third common voltage line 131c which is disposed in and/or on the same layer as the data conductor 171, 173 and 175, and the first common voltage line 131a which is disposed in and/or on the same layer as the gate conductor 121 and 124 may be connected to the common electrode 270 through one single contact hole or different contact holes.

Many features of the exemplary embodiment of the liquid crystal display which is described above with reference to FIG. 1 to FIG. 4, many features of the exemplary embodiment of the liquid crystal display which is described above with reference to FIG. 5 to FIG. 6, and many features of the exemplary embodiment of the liquid crystal display which is described above with reference to FIG. 7 and FIG. 8 may be applied to the liquid crystal display illustrated in FIG. 10.

Figure 11:
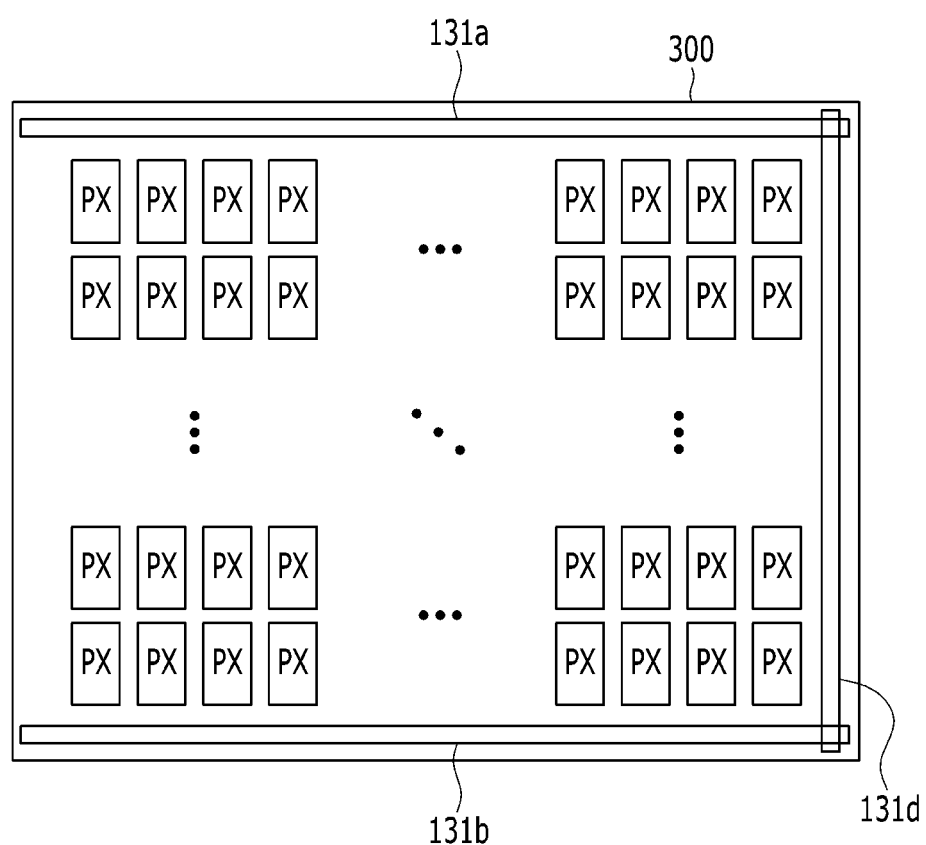
FIG. 11 is a schematic plan view of still another exemplary embodiment of a liquid crystal display according to the invention.

Now, with reference to FIG. 11, still another exemplary embodiment of a liquid crystal display according to the invention will be described. FIG. 11 is a schematic plan view of still another exemplary embodiment of a liquid crystal display according to the invention.

Referring to FIG. 11, the liquid crystal display 300 is similar to the exemplary embodiments of the liquid crystal display illustrated in FIG. 1, FIG. 5, FIG. 7 and FIG. 9.

However, the liquid crystal display 300 illustrated in FIG. 11 further includes a fourth common voltage line 131d which extends along the column direction of the plurality of pixels PX in addition to the first common voltage line 131a and the second common voltage line 131b which extend in the row direction of the plurality of pixels PX.

As described above, the first common voltage line 131a and the second common voltage line 131b are disposed in and/or on a same layer as the gate conductor 121 and 124 in the plurality of pixels PX and the fourth common voltage line 131d is disposed in and/or on a same layer as the data conductor 171, 173 and 175 in the plurality of pixels PX.

As described with reference to FIG. 8, the fourth common voltage line 131d which is disposed in and/or on the same layer as the data conductor 171, 173 and 175, and the first common voltage line 131a and the second common voltage line 131b which are disposed in and/or on the same layer as the gate conductor 121 and 124 may be connected to the common electrode 270 through one single contact hole or different contact holes.

Many features of the exemplary embodiment of the liquid crystal display which is described above with reference to FIG. 1 to FIG. 4, many features of the exemplary embodiment of the liquid crystal display which is described above with reference to FIG. 5 to FIG. 6, and many features of the exemplary embodiment of the liquid crystal display which is described above with reference to FIG. 7 and FIG. 8 may be applied to the liquid crystal display illustrated in FIG. 11.

Figure 12:
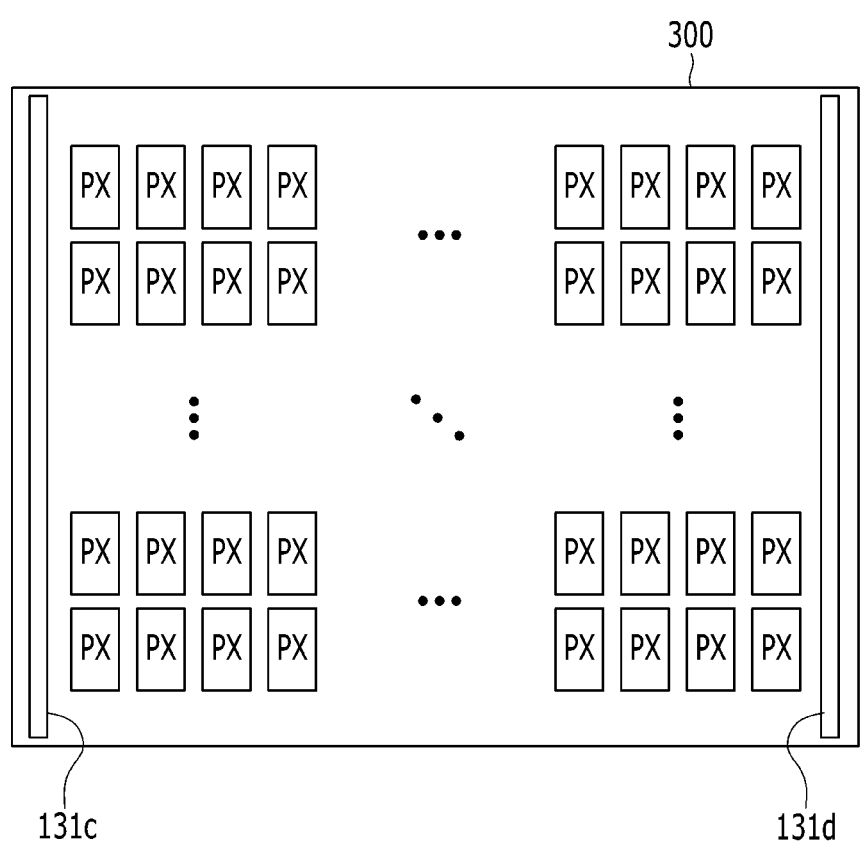
FIG. 12 is a schematic plan view of still another exemplary embodiment of a liquid crystal display according to the invention.

Now, with reference to FIG. 12, still another exemplary embodiment of a liquid crystal display according to the invention will be described. FIG. 12 is a schematic plan view of an exemplary embodiment of a liquid crystal display according to the invention.

Referring to FIG. 12, the liquid crystal display 300 is similar to the liquid crystal display 300 according to the exemplary embodiments illustrated in FIG. 1, FIG. 5, FIG. 7 and FIG. 9.

However, the liquid crystal display illustrated in FIG. 12 further includes a third common voltage line 131c and a fourth common voltage line 131d which extend along the column direction of the plurality of pixels PX. That is, the liquid crystal display 300 in FIG. 12 does not include any common voltage lines extending along the row direction of the plurality of pixels PX.

As described above, the third common voltage line 131c and the fourth common voltage line 131d are disposed in and/or on a same layer as the data conductor 171, 173 and 175 in the plurality of pixels PX.

Many features of the exemplary embodiment of the liquid crystal display which is described above with reference to FIG. 1 to FIG. 4, many features of the exemplary embodiment of the liquid crystal display which is described above with reference to FIG. 5 to FIG. 6, and many features of the exemplary embodiment of the liquid crystal display which is described above with reference to FIG. 7 and FIG. 8 may be applied to the liquid crystal display illustrated in FIG. 12.

One or more exemplary embodiment of the liquid crystal display according to the invention may be applied to various pixel structures in which the pixel electrode and the common electrode are disposed on one single substrate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate;
a gate line and a data line on the first substrate;
a plurality of display pixels arranged in a row direction and a column direction of a matrix, on the first substrate,
each display pixel comprising a pixel electrode and a common electrode on the first substrate, and an insulating film between the pixel and common electrodes, wherein the pixel electrode comprises a plurality of branch electrodes and the common electrode overlaps the plurality of branch electrodes;
a plurality of non-display dummy pixels at an edge of the matrix of display pixels;
a second substrate overlapping the first substrate;
a liquid crystal layer disposed between the first substrate and the second substrate; and
a first common voltage line outside the matrix of display pixels and extending in the row direction,
wherein the pixel electrode and the common electrode generate an electric field in the liquid crystal layer,
wherein the common electrode extends to the plurality of non-display dummy pixels to define a portion thereof extended to the plurality of non-display dummy pixels, and
wherein the first common voltage line overlaps the plurality of non-display dummy pixels and contacts the common electrode portion extended to the plurality of non-display dummy pixels.

2. The liquid crystal display of claim 1, further comprising:
a signal line outside the matrix of display pixels and connected to the common electrode.

3. The liquid crystal display of claim 2, wherein:
the first common voltage line is in a same layer as the gate line.

4. The liquid crystal display of claim 2, further comprising:
a second common voltage line outside the matrix of display pixels, extending in the row direction, and opposite to the first common voltage line with respect to the matrix of display pixels.

5. The liquid crystal display of claim 4, wherein:
the first common voltage line and the second common voltage line are in a same layer as the gate line.

6. The liquid crystal display of claim 4, further comprising:
a third common voltage line outside the matrix of display pixels and extending in the column direction.

7. The liquid crystal display of claim 6, wherein:
the third common voltage line is in a same layer as the data line.

8. The liquid crystal display of claim 6, further comprising:
a fourth common voltage line outside the matrix of display pixels, extending in the column direction, and opposite to the third common voltage line with respect to the matrix of display pixels.

9. The liquid crystal display of claim 8, wherein:
the third common voltage line and the fourth common voltage line are in a same layer as the data line.

10. The liquid crystal display of claim 2, further comprising:
a third common voltage line outside the matrix of display pixels and extending in the column direction.

11. The liquid crystal display of claim 10, wherein:
the third common voltage line is in a same layer as the data line.

12. The liquid crystal display of claim 10, further comprising:
a fourth common voltage line outside the matrix of display pixels, extending in the column direction, and opposite to the third common voltage line with respect to the matrix of display pixels.

13. The liquid crystal display of claim 12, wherein:
the third common voltage line and the fourth common voltage line are in a same layer as the data line.

\* \* \* \* \*